United States Patent [19]
Mizukoshi et al.

[11] Patent Number: 5,825,767
[45] Date of Patent: Oct. 20, 1998

[54] ATM SWITCH WITH INPUT AND OUTPUT PORTS

[75] Inventors: Nobuyuki Mizukoshi; Ruixue Fan, both of Tokyo, Japan

[73] Assignee: NEC Corporation, Tokyo, Japan

[21] Appl. No.: 760,374

[22] Filed: Dec. 4, 1996

[30]     Foreign Application Priority Data

Dec. 6, 1995   [JP]   Japan ................................. 7-318338

[51] Int. Cl.[6] ........................................................ H04J 3/24
[52] U.S. Cl. ........................ 370/395; 370/390; 370/414; 370/429
[58] Field of Search ..................................... 370/389, 390, 370/395, 396, 400, 399, 409, 413, 419, 422, 429, 393, 397, 414

[56]             References Cited

U.S. PATENT DOCUMENTS

| | | | |
|---|---|---|---|
| 5,365,519 | 11/1994 | Kozaki et al. ............................ | 370/391 |
| 5,410,540 | 4/1995 | Aiki et al. .................................. | 370/60 |
| 5,570,348 | 10/1996 | Holden .................................... | 370/414 |
| 5,583,861 | 12/1996 | Holden .................................... | 370/395 |

FOREIGN PATENT DOCUMENTS

| | | |
|---|---|---|
| A 0336373 | 10/1989 | European Pat. Off. . |
| A 0363053 | 4/1990 | European Pat. Off. . |
| 6-62041 | 3/1994 | Japan . |

OTHER PUBLICATIONS

H. Saito; "Multicast Function and Its LSI Implementation In A Shared Multibuffer ATM Switch"; Proceedings of the Conference on Computer Communications (INFOCOM), Toronto, Jun. 12–16, 1994; pp. 315–322.

*Primary Examiner*—Douglas W. Olms
*Assistant Examiner*—Shick Hom
*Attorney, Agent, or Firm*—Sughrue, Mion, Zinn, Macpeak & Seas, PLLC

[57]              ABSTRACT

When a multi-cast cell to be sent to a plurality of output ports is inputted, an address pointer designating the address of storage of the multi-cast cell in the shared buffer is re-cued by copying the cell, for instance from a multi-cast cell address buffer, to address buffers for pertinent output ports. The address pointer of this multi-cast cell is preliminarily stored at a time in small capacity buffers for these output ports and then successively transferred to the address buffers during writing of the multi-cast cell. Since cast cells and multi-cast cells are each given a next address pointer designating an address to be next accessed. A single cast cell and a multi-cast cell are chained via an address cell, which indicates that the succeeding cell is a multi-cast cell. The multi-cast cells in the shared buffer are outputted in a logically re-cued form to their pertinent output ports.

16 Claims, 11 Drawing Sheets

ATM SWITCH WITH INPUT AND OUTPUT PORTS

BACKGROUND OF THE INVENTION

The present invention relates to ATM switches with input ports and output ports and methods for controlling the same and, more particularly, to ATM switches having a shared buffer and methods of controlling the same.

The ATM switch of this type has a plurality of input ports and a plurality of output ports, and transfers ATM cells from certain input ports to certain output ports. The ATM cell, as is well known in the art, has a fixed length of 53 bytes. Of these bytes, 5 bytes form a header VCI, VPI, etc. identifiers, and the remaining 48 bytes form a payload with data, etc. provided therein.

In one type of ATM switch, a common memory having a plurality of addresses is used commonly for a plurality of output ports. In this ATM switch, ATM cells provided from input ports are successively stored in the common memory, while storage addresses of the stored ATM cells in the common memory are successively written in corresponding ones of address buffers, which are provided for the respective output ports, under control of a write controller. For the stored ATM cells to be transferred to the output ports, their address buffers are successively designated by a read controller, and each stored ATM cell is read out from the common memory address read out from its designated address buffer and transferred to the corresponding output port.

In such an ATM switch, a commonly termed multi-cast cell which is to be transferred casting-wise to a plurality of output ports, may be provided as an ATM cell from a single input port. It is thought that the demand for transferring such multi-cast cells will increase in the future.

An ATM switch for processing such multi-cast cells is disclosed in Japanese Laid-Open Patent Publication No. 6-62041. This ATM switch has idle address managing means for managing the idle addresses in a common memory. In this ATM switch, the address of an inputted multi-cast cell in the common memory is stored in address buffers corresponding to the output ports, to which the multi-cast cell is to be cast, at a time under control of a write controller. The idle address managing means determines the multi-cast cell storage address in the common memory to be vacant by discriminating the multi-cast cell address to be outputted latest in the address buffer.

The disclosed ATM switch has address buffers, which are each provided independently hardware-wise in correspondence to each output port. Each address buffer includes a counter, which indicates the amount of content in each address buffer for discriminating the latest outputted multi-cast cell address.

In this ATM switch, upon arrival of a multi-cast cell the address of the multi-cast cell storage area in the common memory has to be stored at a time in address buffers corresponding to the output ports, to which the casting is to be performed.

This means that the address of the arrived multi-cast cell in the common memory has to be copied and stored as an address pointer in the corresponding address buffers at a time.

The copying of the arrived multi-cast cell address and storing thereof as an address pointer in the corresponding address buffers at a time, makes it difficult to construct the plurality of address buffers as a single RAM or like memory. In other words, with a single memory having a small data input bit width, it is impossible to provide a plurality of address buffer areas and permit an address to be written in a plurality of address areas at a time. It is further impossible to designate a plurality of addresses to a single memory at a time. In other words, the ATM switch noted above has a portion which can not be implemented by a semiconductor integrated circuit, which is undesired in view of the size reduction.

SUMMARY OF THE INVENTION

An object of the present invention is therefore to provide a highly economical ATM switch incorporating a shared buffer, which permits smooth processing of multi-cast cells and reducing adverse effects of HOL blocking.

Another object of the present invention is to provide an ATM switch, which can process multi-cast cells efficiently and with a simple scheme.

Other object of the present invention is to provide an ATM switch, which can alleviate the burden of copying shared buffer addresses involved in multi-cast cell processing.

A further object of the present invention is to provide an ATM switch, which can be implemented as a semiconductor integrated circuit for size reduction.

A still further object of the present invention is to provide an ATM switch, which can alleviate or eliminate adverse effects of head-of-line (HOL) blocking.

A yet further object of the present invention is to provide an ATM switch, which does not need to provide a separate storage area from the cell storage areas for counting the times of multi-cast cell casting.

In the present invention, a shared buffer is provided, and each multi-cast cell has a single address in the shared buffer. The multi-cast cell itself may not be outputted to all the output ports at a time. The time required for entirely storing each cell in the shared buffer is long compared to the time required for storing the address from the shared buffer in each address buffer. The address thus may be stored in a plurality of address buffers by utilizing the time that is elapsed during storage of a multi-cast cell in the shared buffer. This means that it is possible to reduce the burden in the case of copying the address and storing the same in a plurality of address buffers.

More specifically, according to an aspect of the present invention, there is provided an ATM switch comprising a plurality of input ports for receiving input cells, a plurality of output ports for outputting output cells, and a shared buffer having a plurality of addresses and capable of processing multi-cast cells each to be outputted to a plurality of output ports, the ATM switch further comprising multi-cast cell buffer for storing, upon arrival of a multi-cast cell, the content of an address pointer indicative of an address in the shared buffer in which to store the multi-cast cell together with multi-casting routing data (information) thereabout, and address buffers provided for the respective output ports, the address pointer content being stored in the address pointers during a free time therein and used to access the shared buffer according to the contents of each address buffer.

According to another aspect of the present invention, there is provided an ATM switch comprising a plurality of input ports for receiving input cells, a plurality of output ports for outputting output cells, and a shared buffer having a plurality of addresses and capable of processing multi-cast cells each to be outputted to a plurality of output ports, the ATM switch further comprising pre-address buffers corresponding to the respective output ports for tentatively storing, upon arrival of the multi-cast cell, an address in the shared buffer in which to store the multi-cast cell, and address buffers corresponding to the respective output ports, the contents in the pre-address buffers being successively transferred to the respective address buffers, the capacity of the address pre-buffers being less than the capacity of the address buffers.

According to other aspect of the present invention there is provided a method of controlling an ATM switch which comprises a plurality of input ports for receiving input cells, a plurality of output ports for outputting output cells, and a shared buffer having a plurality of addresses, the method comprising the steps of generating each of cells including an address pointer indicative of an address in the shared buffer to be next accessed, and address cells including an address pointer indicative of a storage position in the shared buffer in which to store the pertinent cell, forming a cell chain by linking the cells via the address cells, and accessing the shared buffer according to the cell chain.

Other objects and features will be clarified from the following description with reference to attached drawings.

PREFERRED EMBODIMENTS OF THE INVENTION

Figure 1:
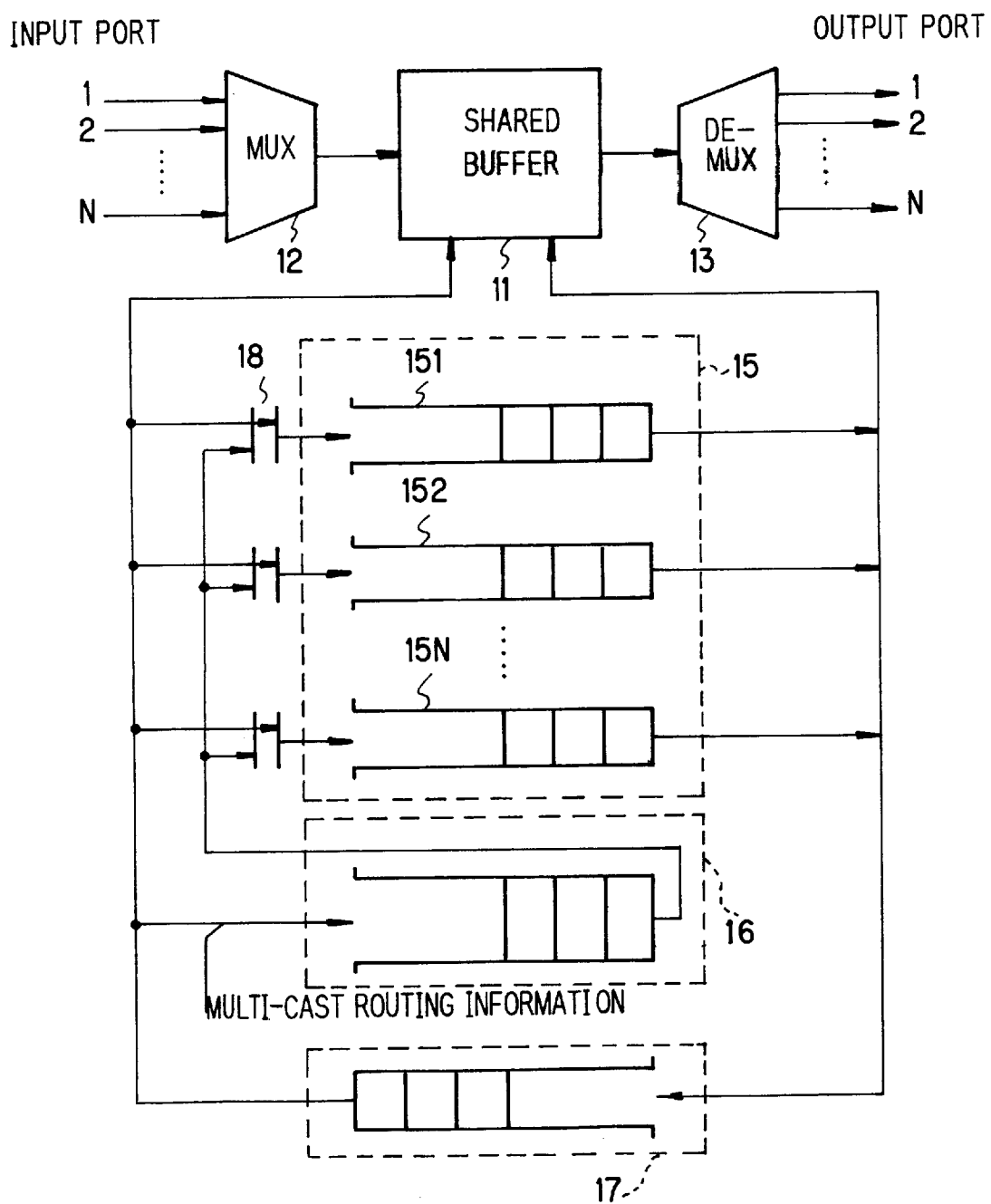
FIG. 1 shows the principal scheme of the ATM switch as one embodiment of the present invention.

FIG. 1 shows the principal scheme of the ATM switch as one embodiment of the present invention. This ATM switch comprises a shared buffer 11, a multiplexer 12 which multiplexes ATM cells from input lines (or input ports) 1 to N for storage in the shared buffer 11, and a demultiplexer 13 which demultiplexes the data read out from the shared buffer 11 to separate and output the ATM cells to output lines (or output ports ) 1 to N. As described above, the ATM cell consists of 53 bytes, 5 bytes thereof forming the header, and the remaining 48 bytes forming the payload.

Figure 10:
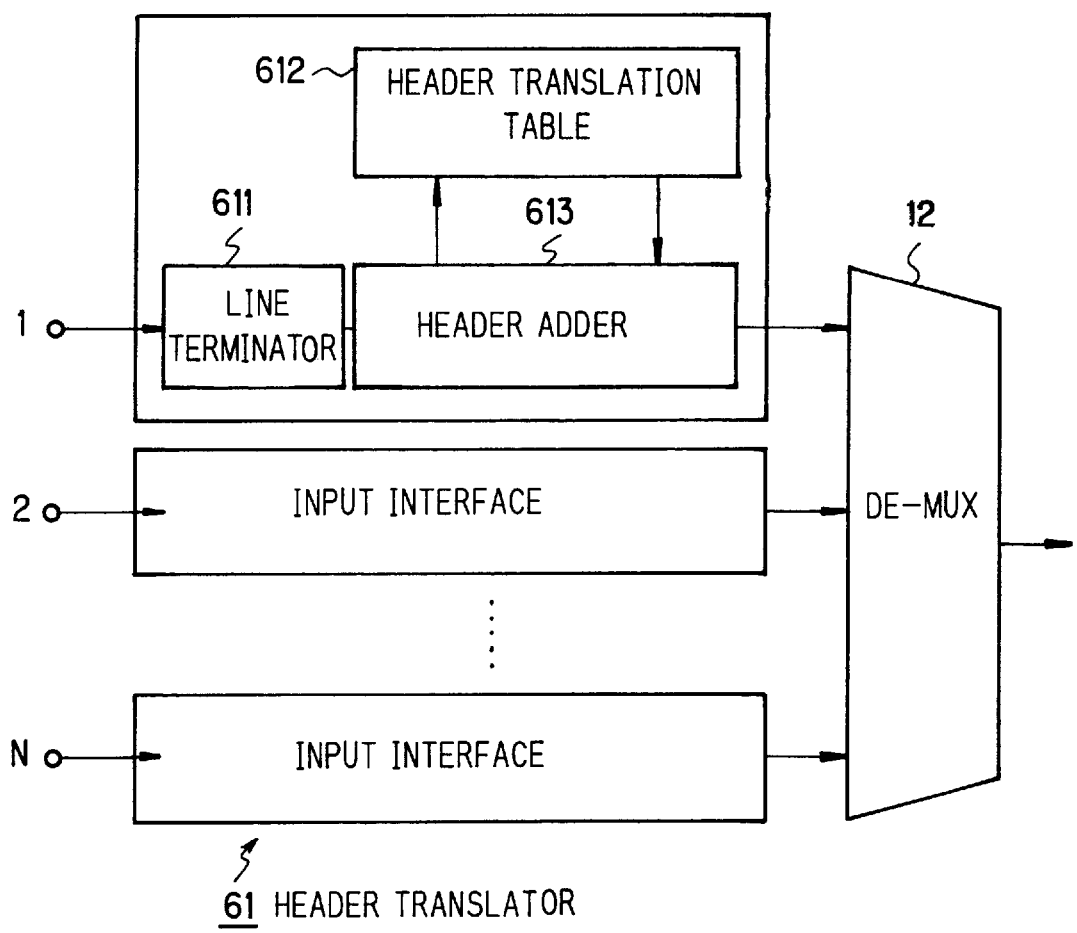
FIG. 10 shows a block diagram of the header translator for header translation of the cell inputted to ATM switch in FIG. 8.

As shown in FIG. 10, a header translator 61 including input interfaces 1 to N individually corresponding to the respective input ports, is connected as a preceding stage to the multiplexer 12. Before describing the internal scheme of the ATM switch, the scheme and operation of the input interfaces 1 to N will be described. The input interfaces 1 to N each includes a line terminator 611, a header translation table 612 and a header adder 613.

An input cell coupled through the line terminator 611 is tentatively stored in a buffer in the header adder, and only a header part is taken out, according to which the header translation table 612 is accessed. The header translation table 612 outputs a header, which is obtained through translation of an area corresponding to the header part, to the header adder 613. The header adder 613 adds the header obtained through the translation to the payload in the input cell and sends out the result to the multiplexer 12. As a result, the multiplexer 12 outputs a cell having a header part which corresponds to a single cast cell or a multi-cast cell. In the illustrated example, the translated cell header part has the header translation data in addition to routing data and also has, in the case of a multi-cast cell, a casting times count (CC).

Referring back to FIG. 1, an address buffer unit 15 which includes 1-st to N-th address buffers 151 to 15N corresponding to the respective output ports 1 to N, is connected to the shared buffer 11.

The ATM switch further comprises a multi-cast cell address buffer 16 and an idle address buffer 17. The multi-cast cell address buffer 16 successively stores common address and multi-casting routing data assigned to the input multi-cast cells to be sent out to corresponding ones of the output ports 1 to N. The idle address buffer 17 stores idle addresses in the shared buffer 11.

ATM cell addresses in the shared buffer 11 are stored as respective address pointers in the 1-st to N-th address buffers 151 to 15N. In each of the address buffers 151 to 15N, the stored address pointers form an address cue. As described above, multi-cast addresses in the shared buffer 11 are stored as respective multi-cast address pointers together with the multi-casting routing data in the multi-cast cell address buffer 16. In the multi-cast cell address buffer 16, the stored multi-cast address pointers form together with the stored multi-casting routing data a multi-cast data cue. Likewise, in the idle address buffer 17, the stored idle addresses form an idle address pointer cue.

As shown, each idle address pointer outputted from the idle address buffer 17 is supplied to the shared buffer 11 and designates an idle address and an ATM cell store position in the shared buffer 11. The idle address pointer is also supplied to the address buffers 151 to 15N via respective preceding selectors 18, and it is also supplied to the multi-cast cell address buffer 16. To the selectors 18 is also sent a multi-cast cell address pointer from the multi-cast cell address buffer 16.

A single cast cell which is inputted as an ATM cell to the ATM switch having the scheme as shown in FIG. 1, is stored in an idle address as designated by the idle address buffer 17. At this time, this idle address is stored as a single cast cell storage position to one of the address buffers 151 to 15N that corresponds to the output port to which the cell is to be outputted.

A multi-cast cell inputted as an ATM cell is also stored in the idle address designated by the idle address buffer 17.

While the multi-cast cell is stored in the shared buffer 11, its address indicative of its storage position is stored together with its multi-casting routing data in the multi-cast cell address buffer 16, and thence sent out to those of the address buffers 151 to 15N which correspond to the output ports to which the multi-cast cell is to be transferred either successively or at a time according to the multi-casting designation data. The operation of sending out the multi-cast cell address to pertinent ones of the address buffers 151 to 15N is hereinafter referred to as re-cueing.

It will be seen that in this embodiment the multi-cast cell address, while being tentatively stored in the exclusively provided multi-cast cell address buffer, is stored in the pertinent ones of the address buffers 151 to 15N by making effective use of such free time as one, during which the multi-cast cell is stored in the shared buffer 11.

With the instant scheme, the address buffers 151 to 15N, the multi-cast cell address buffer 16 and the idle address buffer 17 may be implemented together by a single RAM. The input and output management of the address buffers may be performed by using read pointers and write pointers, or by using a storing method, in which stored data can be read out successively with reference to succeeding storage buffer address data which are stored together with them.

Figure 2:
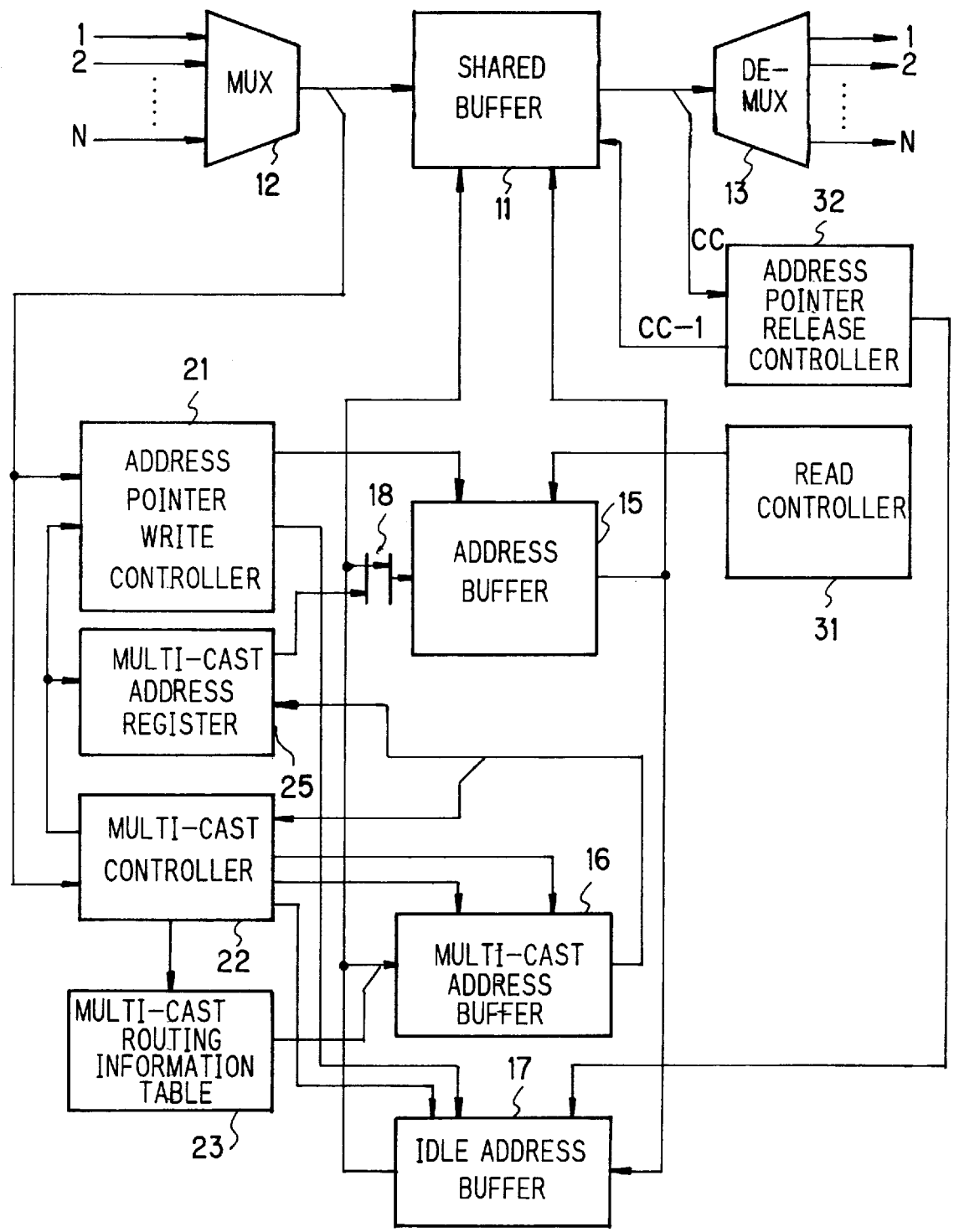
FIG. 2 shows a specific example of the ATM switch having the basic scheme shown in FIG. 1.

FIG. 2 shows a specific example of the ATM switch having the basic scheme shown in FIG. 1. Parts like those in FIG. 1 are designated by like reference numerals. This example comprises, in addition to the address buffer unit 15, the multi-cast cell address buffer 16 and the idle address buffer 17, controllers for controlling these buffers as will be described hereinunder.

Referring to FIG. 2, ATM cells inputted from the input ports 1 to N are multiplexed in the multiplexer 12 and then supplied to the shared buffer 11. Their storage addresses are designated by address pointers taken out from the idle address buffer 17. The idle address buffer 17 outputs, as storage addresses, idle address pointers taken out from its pointer cue in response to instructions from an address pointer write controller 21 or a multi-cast controller 22, the outputted storage addresses being supplied to the shared buffer 11.

As described before in connection with FIG. 1, the idle address pointers are also supplied to the address buffer unit 15 and the multi-cast cell address buffer 16.

Figure 3:
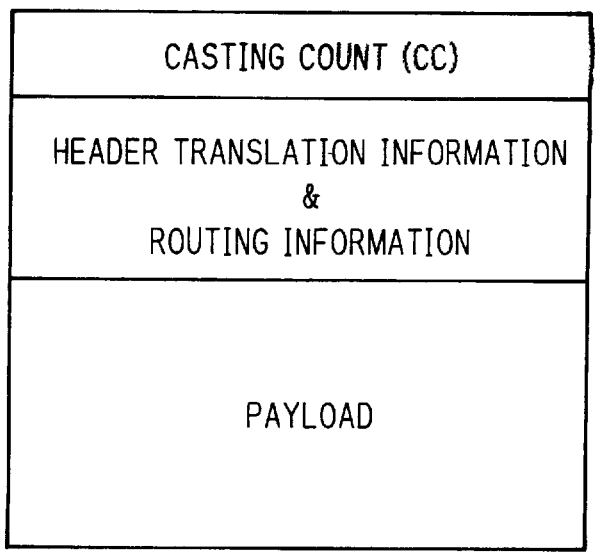
FIG. 3 shows an example of the configuration of the ATM cell which is stored in the shared buffer 11.

FIG. 3 shows an example of the configuration of the ATM cell which is stored in the shared buffer 11. The illustrated ATM cell comprises a header and a payload, the header including a casting count area, a header translation data area and a routing data area. The casting count area contains a casting count (CC), which represents the number of output ports to which casting is to be made. This means that the casting count (CC) takes an integer greater than "1" with a multi-cast cell, while it is "1" with a single cast cell.

In the header translation data area, usually an output cell header is provided. When the header translation is performed again at the time of the cell output, intermediate data of cell translation is provided. In the routing data area, the routing data is provided, which is processed by the address pointer write controller 21 and the multi-cast controller 22 shown in FIG. 2. In the illustrated example, the header translation data provided in the header translation data area and the casting count provided in the casting count area, are stored together with cell data which is provided in the payload in the shared buffer 11 (FIG. 2).

The operation when a single cast cell having the ATM cell configuration as shown in FIG. 3 will now be described with reference to FIG. 2. The address pointer write controller 21, upon receipt of the routing data, determines that the input cell is a single cast cell, and instructs the idle address buffer 17 to output an idle address pointer. The idle address pointer thus read out from the idle address buffer 17 is sent as an input cell write address pointer to the shared buffer 11.

A single cast cell address pointer which is used for the input cell storage, is written in one of the address buffers 151 to 15N corresponding to the output ports of the address buffer unit through a corresponding selector 15 under control of the address pointer write controller 21.

The multi-cast controller 22, upon input of a multi-cast cell as the input cell, determines from the routing data of the input cell that the input cell is a multi-cast cell. The multi-cast controller 22 thus instructs the idle address buffer 17 to output the idle address pointer. According to this instruction, the idle address buffer 17 sends out an idle address as the input cell write address to the shared buffer 11. The shared buffer 11 thus starts the storage of the multi-cast cell.

The multi-cast controller 22 then accesses a multi-casting routing data table 23 according to the received routing data. In the multi-casting routing data table 23, multi-casting routing data about the output ports to which the multi-cast cells are to be outputted are stored, and when this table is accessed from the multi-cast controller 22, it sends out a multi-casting routing data to the multi-cast cell address buffer 16. Each multi-casting routing data designates the output ports to which the pertinent multi-cast cell is to be outputted, and also designates the corresponding address buffers in the address buffer unit 15 (FIG. 1).

As described above, in the multi-address buffer 16 are stored, in addition to the multi-casting routing data, the idle addresses in the shared buffer 11 in which to store the multi-cast cells as the address pointers. The above multi-cast designation data and the associated address pointer are thus stored as a set and at a time in the multi-cast cell address buffer 16. Sets of multi-casting routing data and address pointer are each stored whenever a multi-cast cell arrives, and such sets are stored successively to form a cue in the multi-cast buffer 16.

The multi-casting routing data and address pointers that have been stored in the multi-cast cell address buffer 16 are taken out successively from the forefront of the cue. The multi-casting routing data are sent to the multi-cast controller 22, while the address pointers are sent to a separately provided multi-cast address register 25.

The input cell has such a length that its writing in the shared buffer 11 requires several clock pulses, while one clock pulse is sufficient for the writing of the address pointer and like data in the multi-cast register 16. In the multi-cast controller 22, operations necessary for processing a multi-cast cell may be performed within the time of writing of an input cell in the shared buffer 11.

According to the multi-casting routing data, the multi-cast controller 22 provides successive instructions to the address pointer write controller 21 to write the multi-cast address pointers read out from the multi-cast cell address buffer 16 in the corresponding address buffers in the address buffer unit 15. The address pointers that are indicative of the multi-cast cell storage addresses in the shared buffer 11, are thus stored in all the corresponding address buffers in the address buffer unit 15. This operation can be carried out by utilizing a free time, which is made available when the time necessary for processing one address pointer is shorter than the time necessary for writing or reading out one input cell in or from the shared buffer 11, and also a free time available when no ATM cell is inputted or outputted. These free times are hereinafter referred to as process-free times occurring in the shared buffer 11.

Now, the operation of outputting ATM cells stored in the shared buffer 11 as the output cells will be described. When a read controller 31 designates the address buffer or cue in the address buffer unit 15 corresponding to a cell to be outputted, an address pointer is taken out from the forefront of the cue and sent out as an output cell read address pointer to the shared buffer 11 and also to the idle address buffer 17.

According to the output cell read address pointer, an output cell is read out from the shared buffer 11 and outputted through the demultiplexer 13 to the corresponding output port or ports.

The casting count (CC) of the output cell read out from the shared buffer 11 is sent out to an address pointer release controller 32.

When the casting count (CC) is "1", the address pointer release controller 32 instructs the idle address buffer 17 to write the address pointer corresponding to the output cell as an idle address pointer in the idle address buffer 17. In this way, a plurality of address pointers are successively stored on the idle address buffer 17.

When the casting count (CC) is "2" or above, the address pointer release controller 32 decrements the casting count (CC) by one and writes the resultant value (CC-1) in a casting count part of the area of the idle address buffer 17, in which the pertinent output cell is stored. The address pointer release controller 32 then instructs the idle address buffer 17 not to write the pertinent address pointer as the idle address pointer.

As shown above, in the embodiment of the present invention shown in FIGS. 1 to 3, after the address pointers for multi-cast cells have been written in the multi-cast buffer 16, they are sent out and stored in the address buffer unit 15 during the process free times, that is, they are re-written as an address cues in the address buffers in the address buffer unit 15. In other words, the multi-cast cell address pointers are successively stored in a re-cued fashion in the address buffer unit 15 during the process-free times. The same multi-cast address thus can be successively written on a time-division bases in a plurality of address buffers corresponding to predetermined casting destinations.

Unlike the prior art, it is thus not necessary to simultaneously write a plurality of address pointer cues, and it is possible to store a plurality of address pointer cues in a usual RAM providing a small data bit width at the time of the input. In addition, since the cues can be collectively stored in a single RAM, a compact system can be realized by using a large capacity RAM. Moreover, as shown in FIG. 4, it is possible to reduce the hardware required for processing multi-cast cell address pointers and implement the address buffer unit 15, the multi-cast cell address buffer unit 16 and the multi-cast data table 23 with a usual RAM which is used on a time-division basis.

Figure 4:
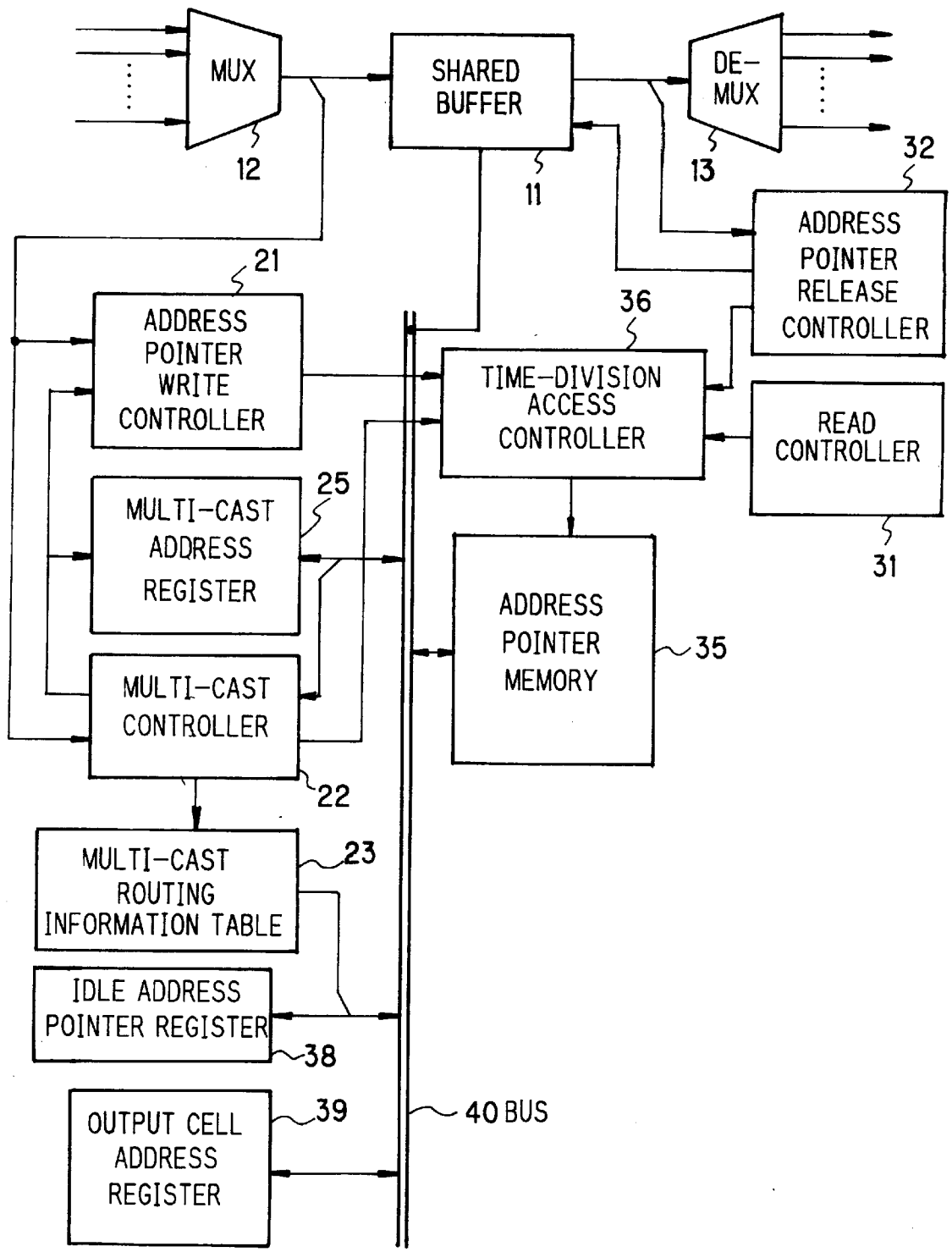
FIG. 4 shows a different embodiment of the ATM switch having the basic scheme as shown in FIG. 1.

FIG. 4 shows a different embodiment of the ATM switch having the basic scheme as shown in FIG. 1. This ATM switch is different from the ATM switch shown in FIG. 2 in that it comprises an address pointer memory 35, which constitutes the address buffer unit 15, the multi-cast cell address buffer 16 and the idle address buffer 17. The address pointer memory 35 is a single port memory which permits reading or writing once in one cycle.

In the case shown in FIG. 2, the address buffer unit 15, the multi-cast address buffer 16 and the idle address buffer 17 are capable of independent writing and reading. In the case of FIG. 4, in which the operations of the above three different buffers are performed in the single address pointer memory 35, however, the individual buffers cannot be independently accessed. Accordingly, in this embodiment a time-division access controller 36 is provided to access the address pointer memory 35 on a time-division basis. The address pointer write controller 21, multi-cast controller 22, read controller 31 and multi-cast pointer release controller 32, these controllers being also shown in FIG. 2, are connected to the time-division access controller 36.

This embodiment of the ATM switch further comprises an idle address pointer register 38 and an output cell address register 39 are connected together with the multi-cast cell address register 25 via a bus 40 to the address pointer memory 35 and the shared buffer 11. The idle address pointer register 38 tentatively stores the idle address pointers read out from the address pointer memory 35. The output cell address register 39 tentatively stores output cell address pointers.

The idle address pointer register 38 is provided to tentatively store, upon cell input, an idle address pointer taken out from an idle address pointer cue in it in the address buffer unit because the address pointer memory 35 is incapable of simultaneous reading and writing. Likewise, the output cell address register 39 is provided because it is necessary to tentatively store, for cell output, the address pointer of the output cell in it in order to write address pointers taken out from the address buffer unit as an address pointer cue.

The ATM switch shown in FIG. 4 operates in the same way as the ATM switch shown in FIG. 2 except that the address pointer memory 35 is accessed on a time-division basis, and that pointers are written or read out on a time-division basis.

With the arrangement shown in FIG. 4, in which the single address pointer memory 35 is used as the address buffer unit, multi-cast address buffer and idle address buffer on a time-division basis, a more compact ATM switch can be obtained compared to the case of providing the individual buffers independently. As a further merit, the address pointer memory 35 can be implemented by an ordinary RAM.

Figure 5:
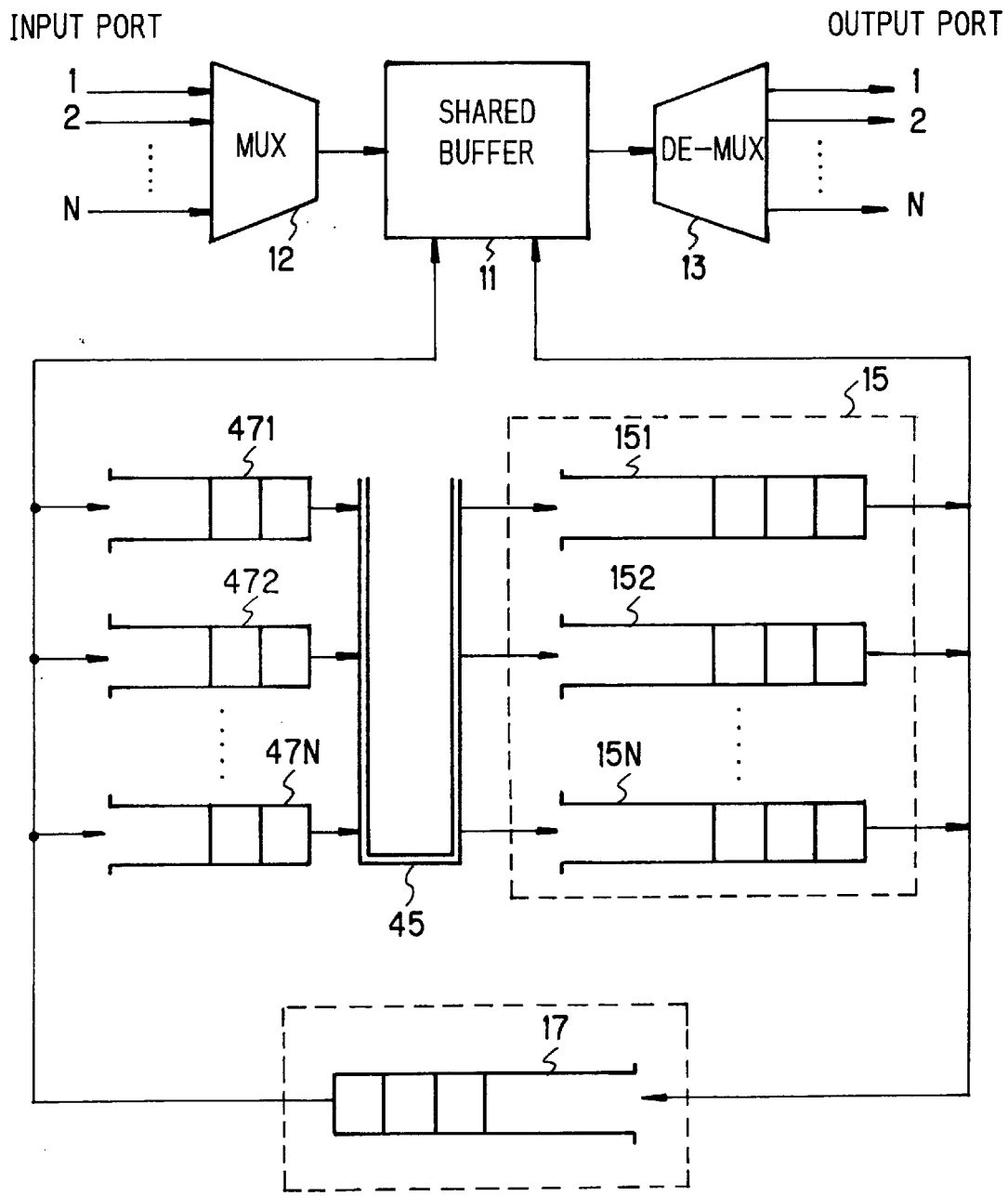
FIG. 5 shows the principal scheme of the ATM switch as a second embodiment of the present invention.

FIG. 5 shows the principal scheme of the ATM switch as a second embodiment of the present invention. This ATM switch is the same as the ATM switch shown in FIG. 1 insofar as it comprises address buffers 151 to 15N (hereinafter referred to as main address buffers) provided for the respective output ports and an idle address buffer 17. In this embodiment, the address buffers 151 to 15N and idle address buffer 17 are implemented by a RAM, which is connected to a bus 45. The RAM requires a great storage capacity, and it is thus desirably formed as an LSI which includes various controllers for controlling the shared buffer 11. The bus 45 used in this embodiment is capable of transferring one address pointer in one time slot.

In the controller LSI, small capacity buffers and memories can be formed. Specifically, the LSI has small storage capacity buffer memories (hereinafter referred to as output cell address pre-buffers) 471 to 47N which, like the main address buffers 151 to 15N, are provided for the respective output ports.

In other words, the output cell address pre-buffers 471 to 47N are connected to the bus 45 such that they are in one-to-one correspondence to the main address buffers 151 to 15N. The multi-cast cell address pointer of a multi-cast cell that appears as an input cell, is stored in number corresponding to the casting count in pertinent ones of the output cell address pre-buffers 471 to 47N that correspond to the output port to which the cell is to be outputted.

The operation of the above ATM switch will now be described. When an input cell is received through the multiplexer 12 in a state that the idle address pointer is stored in the forefront of a cue in the idle address buffer 17, that the idle address pointer which designates the storage position in the shared buffer 11 in which to store the input cell, is read out from the idle address buffer 17 under control of a write controller, and sent to the pertinent one or ones of the output cell address pre-buffers 471 to 47N as well as to the shared buffer 17. The input cell is thus written in the storage position in the shared buffer 11 designated by the idle address pointer, while the idle address pointer is tentatively held as an input cell storage address pointer in the pertinent ones of the output cell address pre-buffers 471 to 47N.

When a single cast cell is provided as input cell, the input cell storage address pointer is stored in the form of a cue in the pertinent one of the output cell address pre-buffers 471 to 47N that corresponds to the output port to which to output the input cell.

When a multi-cast cell is provided as the input cell, the input cell storage address pointer stored in the idle address buffer 17 is stored at a time or successively in pertinent ones of the output cell address pre-buffers 471 to 47N corresponding in number to the casting count, i.e., corresponding to the output ports to which to output the cell.

From the pertinent ones of the output cell address pre-buffers 471 to 47N, the address pointer is successively sent out to the bus 45, and stored as an output address pointer on the time division basis in those of the address buffers 151 to 15N corresponding to the pertinent ones of the output cell address pre-buffers 471 to 47N. This operation can be performed in the process-free times noted above.

When the output cell is outputted, an output cell storage address pointer in the RAM is read out under instruction by a read controller, and sent out as the idle address pointer via the bus 45 to be stored in the shared buffer 11.

In this embodiment, a multi-cast cell address pointer which is tentatively stored in pertinent ones of the output cell address pre-buffers 471 to 47N formed in the RAM, is sent via the bus 45 to the corresponding ones of the address buffers 151 to 15N.

Assuming that the access speed of the LSI including the small storage capacity buffers 471 to 47N and the shared buffer 11 and the access speed of the LSI and the RAM to be equal, since the address pointer consists of about 2 bytes while the ATM cell consists of 53 bytes, it is possible to obtain about 26 times of address pointer transfer through the bus during the operation of the input or output of a single cell. Thus, the address pointer transfer through the bus 46 does not interfere with operation in the case of a single cast cell. In the case of a multi-cast cell, the time division does not interfere with operation so long as the casting count is not greater than the number of address pointer transfer times. Even in the case when the casting count is greater than the address pointer transfer times number, it is possible, by providing the cues formed in the LSI with adequate depths, to alleviate the burden due to the transfer compared to the case of storing an address pointer generated upon input of a multi-cast cell directly in address buffers.

Moreover, by dividing the address pointer storage area into two divisions one formed in the LSI and one in a RAM separate from the LSI, it is possible to provide an area capable of storing a large amount of address pointers in the external RAM, while alleviating the process upon appearance of a multi-cast cell with the provision of an address pointer storage area in the LSI.

Figure 6:
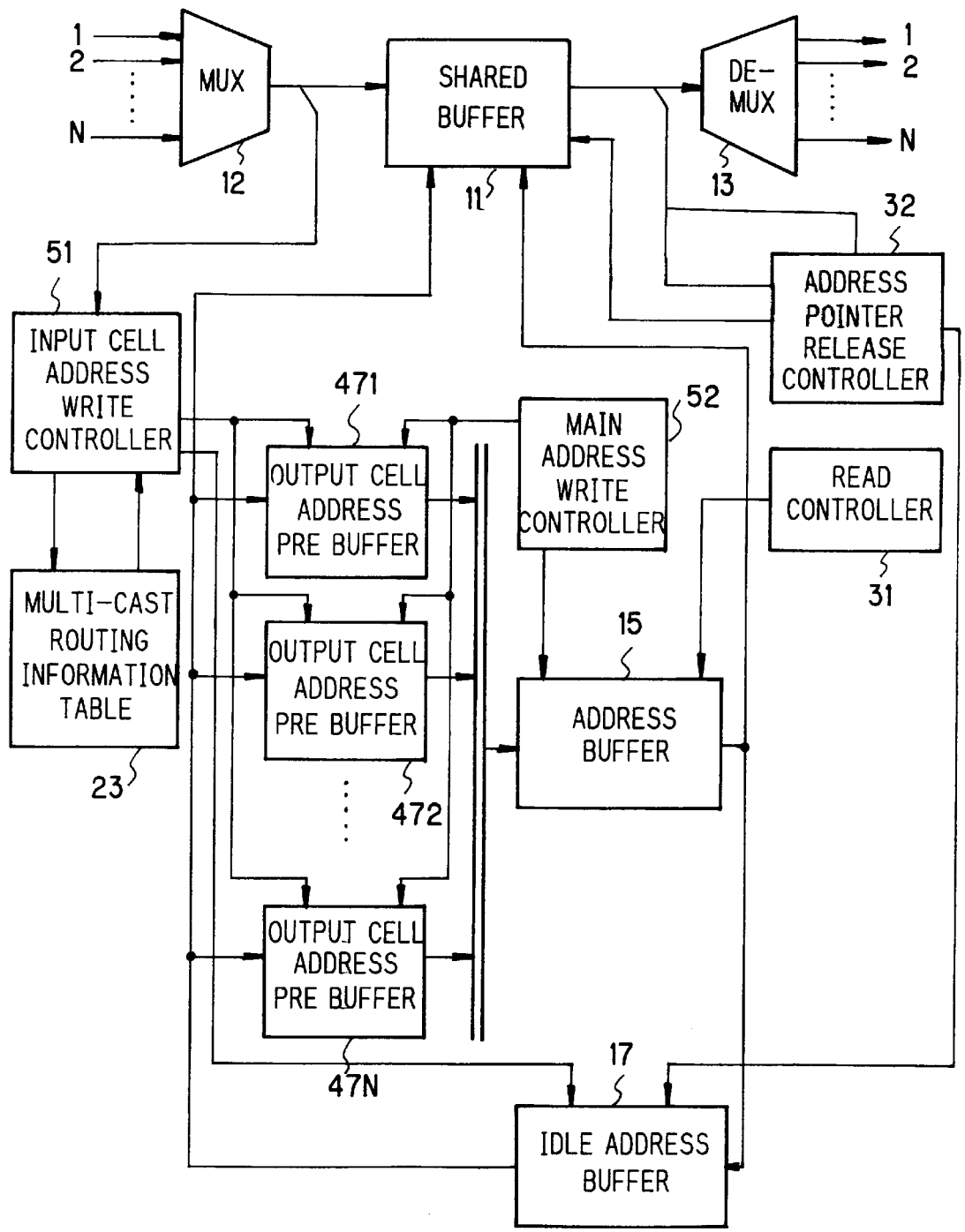
FIG. 6 shows a specific example of the basic scheme shown in FIG. 5.

FIG. 6 shows a specific example of the basic scheme shown in FIG. 5. Like parts are designated by like reference numerals. In this example, the idle address buffer 17 has its input side connected to the output side of the address buffer unit 15, the shared buffer 11 and an address pointer release controller 32 and its output side connected to the shared buffer 11 and the input side of the output cell address pre-buffers 471 to 47N. An input cell address write controller 51 is connected to the multiplexer 12, the output cell address pre-buffers 471 to 47N and a multi-cast data table 23. An output cell read controller 31 is connected to the address buffer unit 15. The input cell address write controller 51 and the output cell read controller 31 are implemented together with the output cell address buffers 471 to 47N with an LSI.

A main address write controller 52 is provided between the output cell address pre-buffers 471 to 47N and the address buffer unit 15. Address pointers stored in selected ones of the output cell address buffers 471 to 47N can be transferred through the bus 45 to corresponding ones of the address buffers in the address buffer unit 15.

In this scheme, when the input cell address write controller 51 receives the routing data of an input cell coupled through the multiplexer 12, it makes a decision as to whether the input cell is a single cast cell or a multi-cast cell, and also provides an instruction to the idle address buffer 17 to read out the idle address pointer therefrom. The read-out idle address pointer is sent as an input cell write address pointer to the shared buffer 11 to store the input cell in the address of the shared buffer 11 designated by the input cell write address pointer.

When a single cast cell is provided as an input cell, the input cell address write controller 51 stores an input cell write address pointer in one of the output cell address pre-buffers 471 to 47N. When a multi-cast cell is given as input cell, the input cell write controller 51 accesses the multi-cast data table 23 to obtain the multi-casting routing data indicative of the output ports to which to output that multi-cast cell from the table 23, and according to the multi-casting routing data it stores the address pointer in the common address buffer 11 simultaneously to those of the output cell address pre-buffers 471 to 47N corresponding to the output ports relevant to the casting. The operation of storing the address pointer in the indicated ones of the output cell address pre-buffers 471 to 47N may be performed on a time-division basis during the storage of the input cell in the shared buffer 11. At any rate, in the case of the input of a multi-cast cell as input cell, the address pointer is stored in the form of a cue in those of the output cell address pre-buffers 471 to 47N corresponding to the output ports relevant to the casting.

As described above, while the writing of an input cell in the shared buffer 11 requires several clock pulses, the writing of an address pointer in one or more of the output cell address pre-buffers 471 to 47N usually takes only a single clock pulse. When the writing of the input cell and the writing of the address pointer are performed simultaneously as described above, a free time corresponding to several clock pulses is generated on the address pointer writing side.

By utilizing this free time, the address pointer is transferred successively under control of the main address write controller 52 from the one or more of the output cell address buffers 471 to 47N to the corresponding one or ones of the address buffers (FIG. 1) which are each provided for each output port.

The address pointer which has been stored in the address buffer unit 15 in the above way, is successively read out in response to instructions from the read controller 31 to be stored as output cell read address pointer in the shared buffer 11. The multi-cast cell storage area in the shared buffer 11 in which the multi-cast cell has been stored, is thus accessed by a plurality of times corresponding to the casting count, i.e., the number of output ports to which to output the multi-cast cell.

The multi-cast cell read out from the shared buffer 11 is successively sent out through demultiplexer 13 as output cells each to each pertinent output port. Every time a cell is sent out, the address pointer release controller 32 decrements the casting count (CC) by one. In this way, control similar to that in the case shown in FIG. 2 is made.

This scheme permits implementing the address buffer unit 15 and idle address buffer 17 which require large storage capacities with an ordinary RAM, while implementing the output cell address pre-buffers 471 to 47N and other controllers of small storage capacities with an LSI.

Again in the ATM switch shown in FIG. 6, address pointers designating multi-cast cell storage positions in the shared buffer 11 are tentatively stored in pertinent ones of the output cell address pre-buffers 471 to 47N and then re-arranged in the address buffer unit 15. In this embodiment, it is also possible to transfer each address pointer by effectively utilizing the process-free times occurring in the shared buffer 11.

Figure 7:
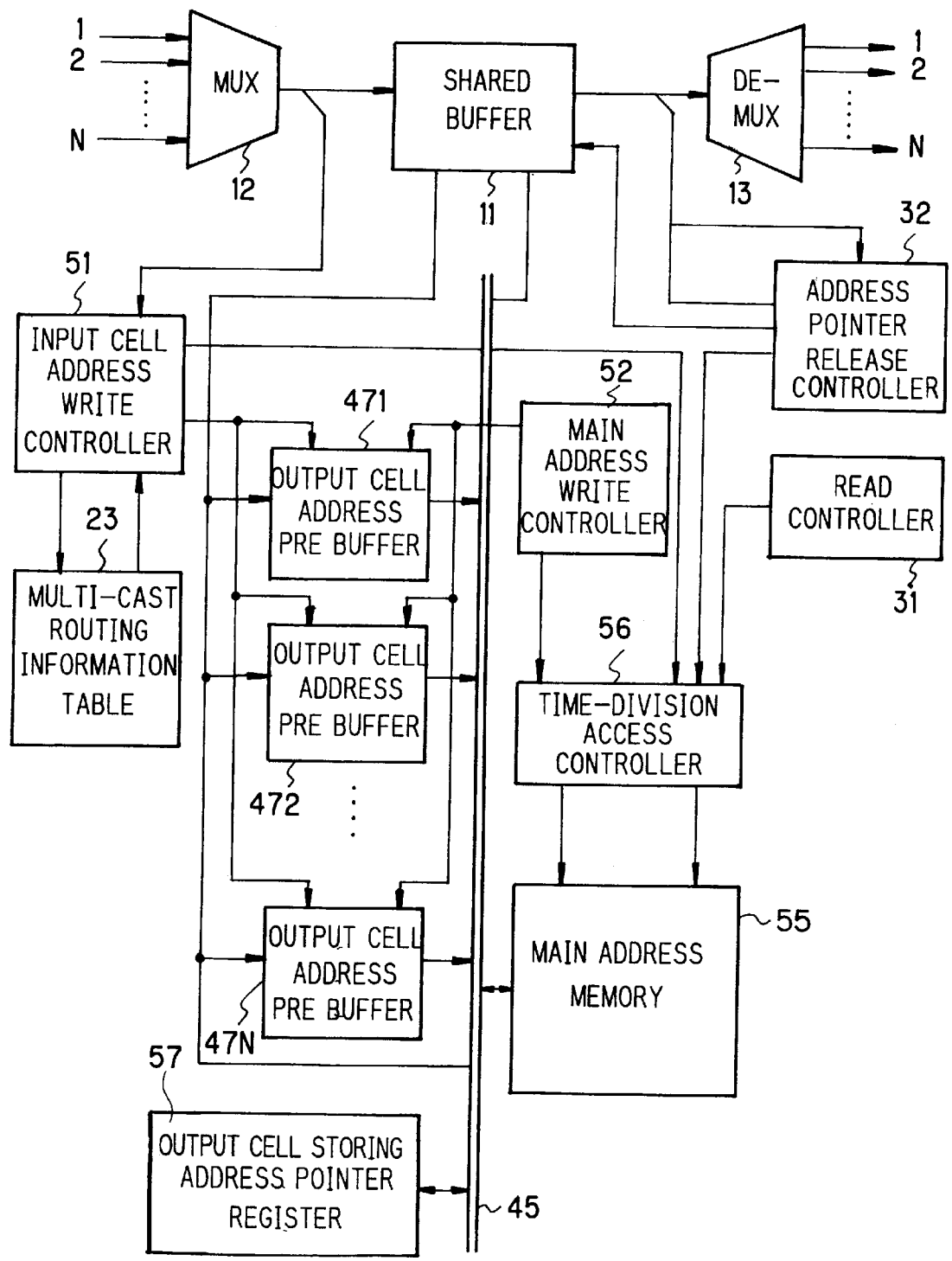
FIG. 7 shows a different example of the basic scheme shown in FIG. 6.

FIG. 7 shows a different example of the basic scheme shown in FIG. 6. This ATM switch comprises a single main address memory 55 in place of the address buffer unit 15 and idle address buffer 17 shown in FIG. 6. The main address memory 55 is used on a time-division basis such that it can serve as the address buffer unit 15 and also as the idle address buffer 17. For the time-division basis operation of the main address memory 55, a time-division basis access controller 56 is connected thereto. An input cell address write controller 51, an output cell address read controller 31 and a main Memory address write controller 52 are connected to the time-division basis access controller 56. From these controllers, address data are supplied on a time-division basis to the main address memory 55. Each address pointer read from an address of the main address memory 55 is supplied as an input cell write address pointer via the bus 45 to the shared buffer 11 and one or more pertinent ones of the output cell address pre-buffers 471 to 47N, and it is further stored in an output cell storage address pointer 57 and thence sent out as an output cell read address pointer to the shared buffer 11.

In response to instructions from the output cell read controller 35, idle address pointers are stored in the main address memory 55.

The operation of the ATM switch shown in FIG. 7 is the same as the operation described before in connection with FIG. 6 except that it is performed on a time-division basis. Therefore, it is not described here.

Figure 8:
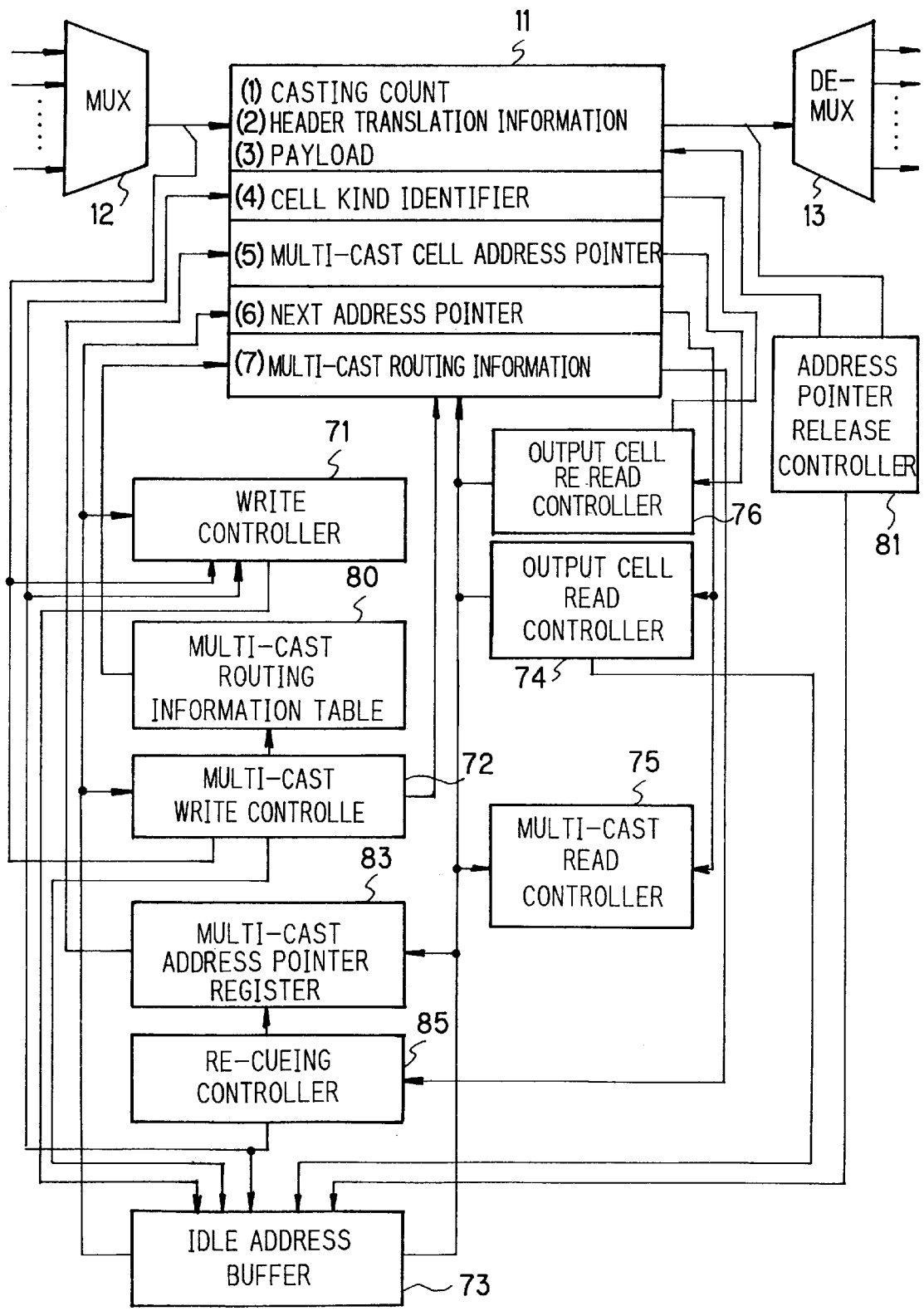
FIG. 8 shows a further embodiment of the ATM switch according to the present invention.

FIG. 8 shows a further embodiment of the ATM switch according to the present invention. In this embodiment, unlike the previous embodiments, re-cueing can be performed in the shared buffer 11. In FIG. 8, address pointer sending routes are shown by bold lines.

In this embodiment, single cast cells, multi-cast cells and address cells are written in the shared buffer 11 as will be described later in detail. As shown in FIG. 8, data necessary for these three different kinds of cells are casting count (CC) (1), header translation data (2), payload (3), cell kind identifier (4), multi-cast cell address pointer (5), next address pointer (6), and multi-cast routing data (or cast routing data) (7). The shared buffer 11 has areas for storing the above data as shown.

An input cell to be supplied to the multiplexer 12 has its header subjected to header translation in a header translator 61 as shown in FIG. 10. The header translation thus contains routing data. In this embodiment, the header of the single cast cell has the cell kind identifier (4) in addition to the header translation data (2). On the other hand, the header of the multi-cast cell, like the case described earlier, has the casting count (1) and the header translation data (2).

Figure 9A:
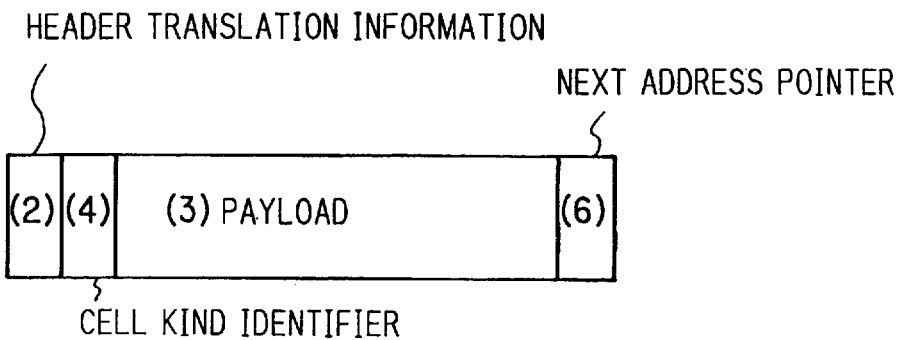
FIGS. 9(A) to 9(C) show the single cast cell, the multi-cast cell and the address cell which are dealt with in the scheme shown in FIG. 8.
Figure 9B:
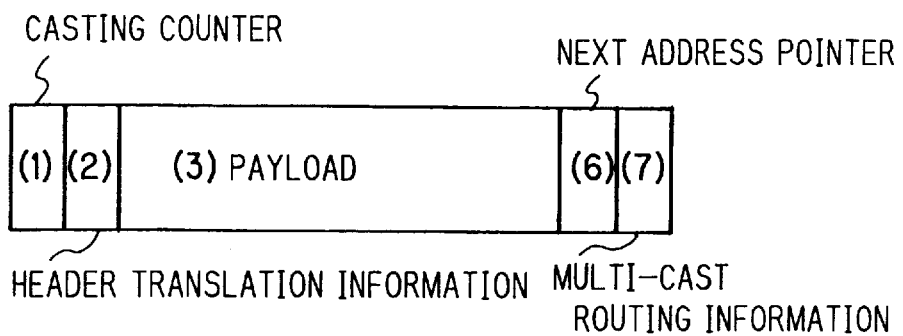
Figure 9C:
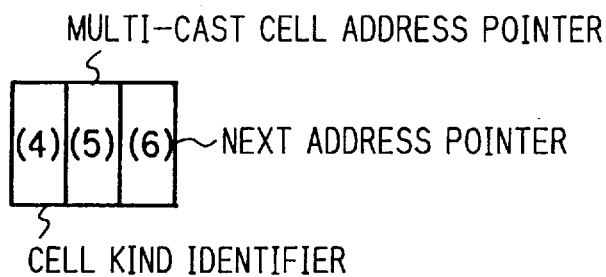

FIGS. 9(A) to 9(C) show the single cast cell, the multi-cast cell and the address cell which are dealt with in the scheme shown in FIG. 8.

The single cast cell, as shown in FIG. 9(A), consists of the header translation data (2), the cell kind identifier (4), the payload (3) and the next address pointer (6). The multi-cast cell, as shown in FIG. 9(B), consists of the casting count (1), the header translation data (2), the payload (3), the next address pointer (6) and the multi-cast routing data (7). The address cell is generated in the ATM switch as shown, and as shown in FIG. 9(C) it consists of the cell kind identifier (4), the multi-cast cell address pointer (5) and the next address pointer (6). The cell kind identifier (4) is for identifying the single cell and the address cell. In this embodiment, it is logic "0" with the single cell and logic "1" with the address cell.

Referring back to FIG. 8, the routing data in the header of a cell that is inputted through the header translator 61 and the multiplexer 12 (hereinafter referred to as present input cell), is sent to a write controller 71 or a multi-cast write controller 72, while the remainder of the present input cell is sent to the shared buffer 11. The storage address at this time is designated by an address pointer outputted from the write controller 71 or the multi-cast write controller 72. At the time when the storage of the present input cell is started, the multi-cast address pointer (5), the next address pointer (6), and the multi-casting routing data (7) have not yet been determined.

The write controller 71 has output buffers each corresponding to each output port. In each buffer is stored an address pointer designating the storage address in which to store a cell to be sent to the corresponding output port. In the multi-cast write controller 72 an address pointer designating a multi-cast cell storage adders is stored. The address pointer stored in the write controller 71 or the multi-cast write controller 72 is sent out as a next address pointer as will be described later.

When the present input cell is a single cast cell, the write controller 71 sends a pertinent one of address pointers held for the respective output ports as an address pointer designating the storage address of the present input cell to the shared buffer 11 according to the routing data. As a result, the present input cell at this moment is stored except for its routing data in the address of the shared buffer 11 designated by the address pointer form the write controller 71.

At this time, the write controller 71 takes out an address pointer from the idle address buffer 73 and holds this address pointer as the new next address pointer. This address pointer taken out from the idle address pointer 73 is stored as the next address pointer (6) together with the present input cell at this moment in the shared buffer 11.

When the present input cell is a multi-cast cell, the multi-cast write controller 72 sends out an address holder held in it as the present input cell storage address pointer to the shared buffer 11. In this case, the operation of the multi-cast write controller 72 to obtain the new next address pointer and the operation of processing this next address pointer are the same as in the case of a single cast cell.

When a multi-cast cell is inputted, however, unlike the case of a single cast cell, the multi-cast write controller 72 accesses the multi-casting destination table 80 according to the routine data and the multi-casting routing data (7) from the table 80 is stored together with the present input cell in the shared buffer 11.

By the above operations, a cue is formed for single cast cells in the shared buffer 11 in the form of a chain with respect to the corresponding output ports, while for multi-cast cells a separate cue in the form of a chain exclusive for these cells is formed. The instant scheme is the same as the scheme shown in FIG. 1 so long as the cue for single cast cells and the cue for multi-cast cells are formed separately, but it is different from the case shown in FIG. 1 in that these cues are formed in the shared buffer 11.

With the cues for single cast cells and multi-cast cells formed in the shared buffer 11, the multi-cast read controller 75 does the re-cueing operation described above in a free time in the shared buffer 11.

At this time, an address pointer designating a storage position in the shared buffer 11 at the forefront of the multi-cast cell cue, has been stored in a multi-cast read controller 75. In this state, the multi-cast read controller 75 sends the multi-cast cell cue forefront address pointer held in it to a multi-cast cell address pointer register 83 as well as to the shared buffer 11.

As a result, only the next address pointer (6) and the multi-casting designation data (7), which are stored together with the cell data in the storage position designated by this address pointer, is read out from the shared buffer 11 under control of the multi-cast read controller 75. The next address pointer (6) thus read out is sent to the multi-cast read controller 75, while the multi-casting routing data (7) is sent to a re-cueing controller 85.

These operations are performed in free times occurring in the shared buffer 11. At any rate, the times required for the reading of the next address pointer and the multi-casting routing data and the processing of the multi-address cell are shorter than the times of writing and reading the entirety of the cell in and out of the shared buffer 111. Therefore, it is possible to perform the reading of the multi-address pointer and the multi-casting routing data and the processing of the address cell a plurality of times in free times in the processing of one cell.

The next address pointer (6) read out in the above operation, is held as the address pointer designating the next forefront multi-cast cell in the multi-cast read controller 75.

In the re-cueing controller 85, an address cell as shown in FIG. 9(C) is formed in the free time noted above according to the read-out multi-casting routing data. The pertinent output at this time is successively sent to the write controller 71. At this time, the re-cueing controller 85 provides an instruction to the write controller 71 to add the address cell to the end of the cue formed in the form of the output port chain. The operation of adding the address cell to the end of the cue, is performed in the same manner as when a single cast cell is inputted. As a result of this operation, the address cell generated by the re-cueing controller 85 has an address pointer, which has logic "1" as instructed by the re-cueing controller 85 as the cell kind identifier (4) and is stored as the multi-cast address pointer (5) in the multi-cast cell address pointer register 83. Like the single cast cell case, the address cell includes an address pointer which is provided from the idle address buffer 73 as the next address pointer (6).

Multi-cast cell re-cueing is thus obtained by adding such an address cell to the end of the cue of single cast cells corresponding to respective output ports.

Figure 11:
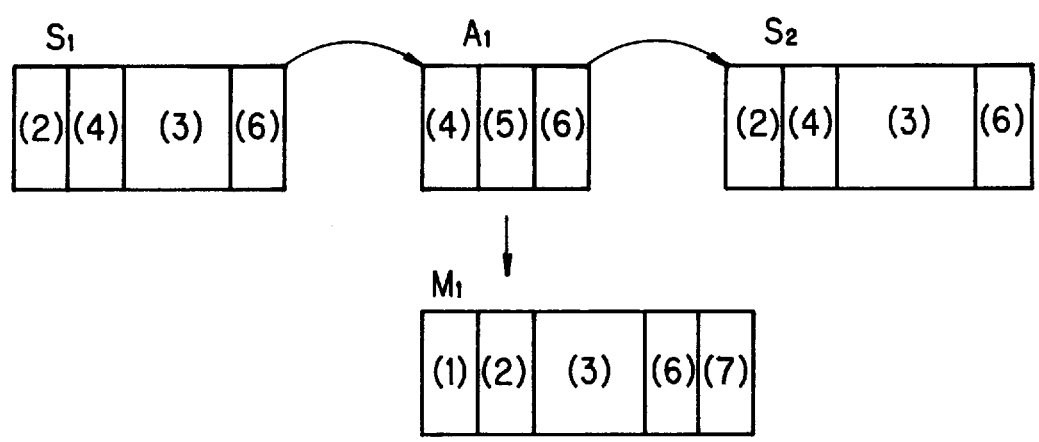
FIG. 11 shows a drawing for explaining the operation of ATM switch in FIG. 8.

By the re-cueing operation, the multi-cast cell is brought to an output port cue in such a manner that it is linked by the address pointer (5) in an address cell A1 as shown in FIG. 11. Referring to FIG. 11, which shows the concept of the above re-cueing operation, when the next address pointer (6) of a single cast cell S1 designates the address of the address cell A1, a multi-cast cell M1 is read out from an address which is designated by the multi-cast address pointer (5) in the address cell A1. This operation is performed for every due corresponding to each output port.

The cell output operation will now be described. First, the output cell read controller 74 sends a pertinent one of address pointers, which designate storage positions in the shared buffer 11 of the forefront cells in the cell cues for respective output ports, to the shared buffer 11. The shared buffer 11 reads out only the next address pointer (6) and the cell kind identifier (4) which are stored together with data stored in the position designated by the address pointer, and sends the read-out next address pointer (6) to the output cell read controller 74 while sending the read-out the cell kind identifier (4) to an output cell re-read controller 76.

The read-out next address pointer (6) is held in the output cell read controller 74 as an address pointer designating the next forefront cell of the pertinent output port.

When the output cell re-read controller 76 determines at this time that the cell kind identifier (4) is logic "0", indicative of a single cast cell, the header translation data (2) and the payload (3) of this single cast cell are read out continually and sent as an output cell to the pertinent output port.

When the cell kind identifier (4) is determined to be logic "1", indicative of an address cell, the multi-cast cell address pointer (5) therein is read out and sent to the output cell re-read controller 76. The output cell re-read controller 76 thus again instructs the shared buffer 11 to read out the pertinent multi-cast cell according to the multi-cast cell address pointer (5). The multi-cast cell thus read out is sent as an output cell to the pertinent output ports.

In order to reduce the number of times of accessing the shared buffer 11, the operation of reading out the multi-cast cell address pointer (5) may be performed simultaneously with the reading of the next address pointer (6) and the cell kind identifier (4) under control of the output cell read controller 74.

When the output cell is outputted to the output ports, the address pointer which has been used to read out the single cast cell or the address cell, is stored as an idle address pointer in the idle address buffer 73.

When an address pointer release controller 81 detects at this time that the casting count that is stored together with the multi-cast cell is "1", it stores the multi-cast address pointer (5) in the output cell re-read controller 76 as an idle address pointer in the idle address buffer 73 and releases the pertinent storage position.

When the casting count is "2" or above, it is decremented by one and then written back in the area, in which it has been stored together with the multi-cast cell in the shared buffer 11. At this time, the multi-cast address pointer (5) is not stored in the idle address buffer 73. Such process concerning the casting count is carried out in the address pointer release controller 81.

While the above embodiment employs the idle address buffer 73 for storing idle address pointers, it is also possible to cue manage the non-used areas in the shared buffer 11 with a next address pointer chain configuration.

While the scheme shown in FIG. 8 was described such that multi-cast cells are stored in the shared buffer 11, it is obviously possible as well to use an exclusive multi-cast cell buffer.

In the system as described in Japanese Laid-Open Patent Publication No. 5-276189, in which cues are prepared for all possible multi-cast cells and, after sending a multi-cast cell to all the designated output ports, the next multi-cast cell is processed, the output of the next multi-cast cell is waited until the present multi-cast cell has been processed.

With the ATM switch according to the present invention, the address in the shared buffer in which a multi-cast cell is stored or the cell itself, is re-cued, i.e., added to the pertinent ones of the single cast cell cues provided for the respective output ports by making use of free times in the shared buffer. The cell thus can be processed as an output cell to be sent to different output ports. It is thus possible to eliminate the adverse effects of the HOL blocking, i.e., waiting of a multi-cast cell in such case as when processing the multi-cast cell as an output cell which is to be sent out at a time to different output ports. This permits extremely increasing the multi-cast cell casting efficiency.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An ATM switch comprising:

a plurality of input ports for receiving input cells;

a plurality of output ports for outputting output cells;

a shared buffer having a plurality of addresses and capable of processing multi-cast cells, each of said multi-cast cells to be outputted to a plurality of output ports;

a multi-cast cell address buffer for storing, upon arrival of a multi-cast cell, an address pointers indicative of an address in said shared buffer in which to store said multi-cast cell, together with multi-casting routing data; and a plurality of address buffers provided for said respective output ports, wherein said address pointer is stored in at least one of said address buffers during a free time and contents of each of said address buffers are used to access said shared buffer, said free time being a time other than a time for cell input or output operation.

2. The ATM switch according to claim 1, wherein each of said multi-cast cells includes a casting count area indicating a casting count, said casting count being decremented by one whenever the multi-cast cell is outputted to an output port.

3. The ATM switch according to claim 1, which further comprises an idle address buffer for storing idle addresses in said shared buffer as idle address pointers, said idle address pointers being stored together with corresponding multi-casting routing data in said multi-cast cell address buffer.

4. The ATM switch according to claim 3, wherein said address buffers, said multi-cast cell address buffer and said idle address buffer are constituted together by a single RAM, said ATM switch further comprising a time-division access controller for accessing said RAM on a time-division basis.

5. An ATM switch comprising:

a plurality of input ports for receiving input cells;

a plurality of output ports for outputting output cells;

a shared buffer having a plurality of addresses and capable of processing multi-cast cells, each of said multi-cast cells to be outputted to a plurality of output ports;

pre-address buffers, corresponding to said plurality of output ports, respectively, for storing, upon arrival of a multi-cast cell, an address in said shared buffer in which to store said multi-cast cell; and address buffers corresponding to said plurality of output ports, respectively.

wherein contents of said pre-address buffers are successively transferred to said address buffers, respectively, and the capacity of said pre-address buffers is less than the capacity of said address buffers.

6. The ATM switch according to claim 5, wherein said pre-address buffers are constituted by an LSI physically different from said address buffers.

7. A method of controlling an ATM switch which comprises a plurality of input ports for receiving input cells, a plurality of output ports for outputting output cells, and a shared buffer having a plurality of addresses, said method comprising the steps of:

generating cells including an address pointer indicative of an address in said shared buffer to be next accessed;

generating address cells including an address pointer indicative of a storage position in said shared buffer in which to store a pertinent of said cells;

forming a cell chain by linking said cells via said address cells; and accessing said shared buffer according to said cell chain.

8. The method of controlling an ATM switch according to claim 7, wherein said cells are each either a single cast cell or a multi-cast cell, each said single cast cell and each said multi-cast cell including respective address pointers and having respective first and second formats different from each other.

9. The method of controlling an ATM switch according to claim 8, wherein said first and second formats each have a next address pointer indicative of a storage position in said shared buffer to be next accessed.

10. The method of controlling an ATM switch according to claim 7, wherein said linking of said cells via said address cells is made in a free time, said free time being a time other than a time for cell input or output operation.

11. The method of controlling an ATM switch according to claim 8, wherein said multi-cast cells are stored together with said single cells and said address cells in said shared buffer.

12. The method of controlling an ATM switch according to claim 8, wherein said single cast cells are stored together with said address cells in said shared buffer, while said multi-cast cells are stored in an exclusive multi-cast cell buffer.

13. An ATM switch comprising a memory for storing input cells, the address of storage of each of said input cells being stored for each output destination of each of said input cells and used to read out said input cells and output said input cells to said each output destination, wherein, when any one of said input cells is a multi-cast cell, the storage address of the multi-cast cell in the memory is read out and stored for said each output destination to be casted.

14. An ATM switch which stores input cells in a memory, wherein when an input cell is a multi-cast cell, an address of said input cell in said memory is stored for pertinent output destinations and transferred, for each of said pertinent output destinations, to a greater storage capacity area, and, according to said address, as read out from said greater storage capacity areas the input cell is read out from the memory to output the input cell to each of the pertinent output destinations.

15. An ATM switch which stores, when an input cell is stored for each output destination in a memory, a memory address corresponding to the output destination of the input cell, after storing the output destination together with the input cell, reads out the input cell together with the next memory address, and successively reads out the next input cell according to the next memory address, with a multi-cast cell provided as the input cell, stores the multi-cast cell together with the next input cell memory address, stores the memory address of the multi-cast cell, in place of the input cell, in said memory for each output destination to be casted, and upon receiving the memory address of the multi-cast cell from said memory, outputs the multi-cast cell to said each output designation.

16. An ATM switch comprising an address buffer and a shared buffer, said shared buffer having a plurality of addresses for storing input cells and reading out each of said input cells for each output port, said input cells being capable of being sent as output cells, wherein processes necessary for multi-cast cells are performed by making use of free times occurring in said shared buffer or in said address buffer, said free times being a time other than a time for cell input or output operation.

* * * * *

UNITED STATES PATENT AND TRADEMARK OFFICE
CERTIFICATE OF CORRRECTION

PATENT NO. : 5,825,767
DATED : October 20, 1998
INVENTOR(S) : Mizukoshi et al.

It is certified that error appears in the above-identified patent and that said Letters Patent is hereby corrected as shown below:

On the title page, in item [56] References Cited, Foreign Patent Documents, insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | JP-A | 4 | 2 | 7 | 6 | 9 | 43 | 10/02/92 | Japan | | | | |
| | JP-A | 7 | 3 | 2 | 1 | 8 | 15 | 08/12/95 | Japan | | | | |
| | JP-A | 4 | 2 | 6 | 2 | 4 | 9 | 01/29/92 | Japan | | | | |
| | JP-A | 5 | 2 | 7 | 6 | 1 | 89 | 10/22/93 | Japan | | | | |
| | | | | | | | | | | | | | |

UNITED STATES PATENT AND TRADEMARK OFFICE
CERTIFICATE OF CORRRECTION

PATENT NO. : 5,825,767  
DATED : October 20, 1998  
INVENTOR(S) : Mizukoshi et al.

It is certified that error appears in the above-identified patent and that said Letters Patent is hereby corrected as shown below:

On the title page, in item [56] References Cited, Foreign Patent Documents, insert the following:

OTHER DOCUMENTS

| | |
|---|---|
| | R. Fan, et al., "Single Chip ATM Switch for Desktop," TECHNICAL REPORT OF IEICE, December 1995, pp. 1-6 |
| | |

Signed and Sealed this

Sixth Day of April, 1999

Q. TODD DICKINSON

*Attest:*

*Attesting Officer*   Acting Commissioner of Patents and Trademarks